United States Patent
DePaola et al.

(10) Patent No.: US 6,405,028 B1
(45) Date of Patent: Jun. 11, 2002

(54) INETWORK ARCHITECTURE FOR CALLING PARTY PAYS WIRELESS SERVICE

(75) Inventors: John J. DePaola, Montclair; John G. Nightingale, Jr., Jamesburg; Lawrence T. Babbio, III, Bridgewater, all of NJ (US); James F. McHenry, Point Pleasant, PA (US)

(73) Assignee: Bell Atlantic Mobile Inc., Bedminster, NJ (US)

( * ) Notice: Subject to any disclaimer, the term of this patent is extended or adjusted under 35 U.S.C. 154(b) by 0 days.

(21) Appl. No.: 09/456,550

(22) Filed: Dec. 8, 1999

(51) Int. Cl.⁷ .............................................. H04M 11/00
(52) U.S. Cl. ........................ 455/406; 455/445; 455/560; 455/408; 455/417
(58) Field of Search .................................. 455/406, 408, 455/445, 410, 417, 560, 433, 558, 428

(56) References Cited

U.S. PATENT DOCUMENTS

| | | | |
|---|---|---|---|
| 4,233,473 A | * 11/1980 | Frost | 179/2 EB |
| 4,706,275 A | * 11/1987 | Kamil | 379/144 |
| 4,930,150 A | * 5/1990 | Katz | 379/93 |
| 5,353,331 A | 10/1994 | Emery et al. | |
| 5,473,667 A | 12/1995 | Neustein | |
| 5,557,664 A | 9/1996 | Burns et al. | |
| 5,579,379 A | 11/1996 | D'Amico et al. | |
| 5,586,177 A | 12/1996 | Farris et al. | |
| 6,058,300 A | * 5/2000 | Hanson | 455/406 |
| 6,078,805 A | * 6/2000 | Scott | 455/406 |
| 6,198,915 B1 | * 3/2001 | McGregor et al. | 455/406 |
| 6,215,790 B1 | * 4/2001 | Voit et al. | 370/401 |
| 6,259,782 B1 | * 7/2001 | Gallant | 379/211 |
| 6,263,056 B1 | * 7/2001 | Gruchala et al. | 379/114 |
| 6,266,523 B1 | * 7/2001 | Cook et al. | 455/403 |
| 6,282,274 B1 | * 8/2001 | Jain et al. | 379/114 |
| 6,301,474 B1 | * 10/2001 | Hatmaier et al. | 455/417 |

* cited by examiner

Primary Examiner—Edward F. Urban
Assistant Examiner—Marceau Milord
(74) Attorney, Agent, or Firm—McDermott, Will & Emery

(57) ABSTRACT

The inventive network architecture and call processing logic enable Calling Party Pays billing for calls to wireless subscribers, including calls that would otherwise leak through the billing operations of the principle carriers. A landline network, such as a LEC network, routes incoming calls to a wireless network and recognizes each call subject to Calling Party Pays billing. If the LEC can bill charges to a party associated with the calling station, the LEC network routes the call to the mobile carrier's network and creates records for billing for the air-time. If the LEC can not bill a calling station subscriber, the LEC network hands the call off to another switch, to select an appropriate one of two or more alternate billing facilities. The alternate billing facilities preferably include a clearinghouse and a credit card billing system. A database indicates whether it is possible to bill for the air-time through the clearinghouse. If so, the switch completes the call to the mobile carrier's network and creates appropriate records to enable the clearinghouse to bill the air-time to a subscriber associated with the calling station. If the call is not billable through the clearinghouse, the switch extends the call to the automated credit card billing system. The credit card system obtains credit card information from the caller and makes all necessary records to bill the air-time charges for the call to the caller's credit card.

16 Claims, 3 Drawing Sheets

INETWORK ARCHITECTURE FOR CALLING PARTY PAYS WIRELESS SERVICE

FIELD OF THE INVENTION

The present invention relates to an enhanced network architecture for providing Calling-Party-Pays billing services for customers of a wireless telephone network, such as cellular or personal communication service (PCS) customers. The enhancements particularly help to reduce the number of calls to the Calling-Party-Pays customers that the carrier(s) can not properly bill to the caller.

BACKGROUND

Modern society offers people many opportunities and in fact places many demands on people to communicate with each other, often over great distances. One of the most common forms of communication involves conversational speech communicated between two or more parties through a telephone network. Modem society also is becoming increasingly mobile. Many new communications services have emerged, to allow people to communicate freely as they roam, without the need for a fixed network connection.

Wireless telephone communication systems have evolved from the Advanced Mobile Phone Service (AMPS) technology, introduced around 1983, to more sophisticated digital-based air interface protocols. Digital access technologies have been developed based on Time Division Multiple Access (TDMA) or Code Division Multiple Access (CDMA) schemes. These digital access technologies are more efficient relative to analog-based access technologies such as AMPS. Digital access technologies have substantial advantages over analog-based systems. Digital cellular systems, however, have not yet been deployed in as many regions as AMPS-based systems. Hence, digital cellular subscribers are offered continuous coverage via dual-mode wireless telephones capable of switching between a digital mode (e.g., CDMA) and an analog mode (e.g., AMPS) based on the availability of a certain technology.

In a normal landline telephone service, call charges are billed to the subscriber associated with the calling station. For purposes of discussion, it sometimes is assumed that the caller is the subscriber associated with the calling station. It will be understood, however, that any one of a number of other persons may be the actual party using the calling station. Long distance charges, for example, normally go to the account of the subscriber associated with the calling station unless the actual caller and/or the called party make some special arrangement, such as an agreement for collect call billing or an 800/888 type "toll-free" calling arrangement. The wireless industry, however, started with a different billing paradigm.

In the United States, the customary billing practice for wireless services has been for the party subscribing to the wireless service to pay for all air-time charges. The wireless carrier charged a monthly subscription fee plus per-minute fees for telephone communications over-the-air to and from each subscriber's telephone. A wireless subscriber paid for the air-time, both on outgoing calls and on incoming calls directed to the subscriber's cellular or PCS telephone. The costs for wireless air-time tended to be high, compared to costs for traditional telephone services.

As a result of the billing paradigm, many wireless subscribers have been reluctant to widely distribute their wireless telephone numbers. Most subscribers did not want to incur large expenses for wireless service usage, particularly on calls from relatively unknown parties, e.g. on solicitation calls. Wireless subscribers often utilized their wireless telephone for outgoing calls, as needed; but they gave their wireless telephone numbers to a limited number of friends or family from whom they were willing to pay to receive calls.

To increase usage and encourage wireless customers to utilize their wireless telephones more even to the extent of replacing landline telephone services, the wireless industry has developed a modified billing arrangement, commonly referred to as "Calling Party Pays." The intent of the service is to generally shift the air-time charges for calls to the wireless telephones from the wireless subscribers to the callers. The calling party pays for all network charges, in a manner more like that used in the normal landline service billing. A number of techniques have been developed for processing and billing call charges on a Calling Party Pays basis.

For example, U.S. Pat. No. 5,353,331 to Emery et al. discloses an intelligent network type integrated wireless and wireline system for processing calls to and from a Personal Communication Service (PCS) subscriber's wireless handset via a home base station or a public cellular network. The service logic in the integrated service control point (ISCP) facilitates of variety of service enhancements to the wireless PCS service. One of the disclosed service enhancements is calling party pays. When the intelligent network functionality detects a call to the PCS customer's number, the network accesses a call processing record for that customer. Based on that record, the network screens the call based on the caller's identity. If the caller is not a recognized party, the ISCP database causes the network to play an announcement asking the caller if he or she is willing to pay all charges for the call. If the PCS subscriber is currently registered via a public wireless network switching office, the announcement would ask if the caller is willing to pay for the air time necessary to complete the call via a wireless link. If the caller accepts the charges, the ISCP provides messages to a landline switch and/or to a mobile switch to instruct them to complete the call and to add charges for the air time to the calling party's telephone bill.

U.S. Pat. No. 5,579,379 to D'Amico et al. includes a disclosure of an AIN-based PCS service essentially the same as in the above discussed Emery et al. Patent. The D'Amico et al. Patent, however, adds further details to the calling party pays operations of that network. When a call directed to a mobile subscriber is detected, the call processing is stopped to determine if the calling party pays feature is in operation. At the same time, the network collects data regarding the calling party for analysis. If the called subscriber is using the calling party pays feature, the ISCP analyzes the caller data to determine if the caller is on a list of those individuals not required by the particular mobile service subscriber to pay for cellular charges. If the calling party does not fall in this category, the network provides an announcement to the calling party, asking the calling party whether or not the calling party is willing to pay for air time necessary to complete the call. In the D'Amico et al. system, if the caller inputs an answer indicating willingness to pay for the air-time, the AIN network functionality obtains correct billing information, and the network completes the call and computes the cellular charges.

In systems like those of Emery et al. and D'Amico et al., a landline carrier typically operates the intelligent network and performs the routing services, for certain aspects of the follow-me functionality of the PCS service. The carrier operating that network also performs the billing services related to the Calling Party Pays feature. Essentially, if the caller is a subscriber of the landline carrier, that carrier adds the air-time charges for the subscriber's normal telephone bill. The landline network carrier, rather than the cellular carrier, bears the responsibility of billing the calling party.

In U.S. Pat. No. 5,557,664, Burns et al. utilize a central database to determine whether to bill a calling party or a called party for charges for completion of a call to a mobile telephone. The system illustrated in this Patent includes switches of a local exchange carrier network, switches of an interexchange carrier (IXC) network, one or more mobile switching centers and a service processor with announcement facilities, service logic and a database. If a caller at station dials a telephone number of a party who subscribes to the calling party pays service, the local exchange switches extend the call to the originating IXC switch. The originating IXC switch provides a message, containing the dialed telephone number, to the service processor. The service processor retrieves a record corresponding to the dialed telephone number, and causes the announcement platform to provide an announcement regarding the pricing of the call through the network to the calling party. If the caller responds to the announcement by staying on the line to indicate acceptance of the charges, the service processor instructs the originating IXC switch to record billing information and notifies the billing system to charge the caller's account. The service processor also provides the mobile identification number (MN) for completion of the call, to the originating IXC switch. The IXC network includes an indicator, preferably in the form of the dialed number, together with the MIN in the signaling to the mobile switching center, as an indication to inhibit normal billing for the call.

U.S. Pat. No. 5,473,667 to Neustein discloses a paging network. The system utilizes an automated attendant, which prompts a caller for desired information, to make a page. As part of the control of a paging operation, a central processor checks the profile of the paged party in the profile data base. The profile data enables the system to provide a number of enhanced services to paging service subscribers. Of note, one of the enhanced services is a service in which a paging party pays for the service on a per call basis. With the disclosed calling party pays type paging service, the caller calls the nearest central station and dials in the number of the pager he desires to page. The caller then enters his own billing number, for example his own telephone number or calling card number. If the billing number is valid, the system accepts an alphanumeric message or voice message from the caller and initiates paging of the called party's paging apparatus.

While all of the systems described above provide some level of effectiveness in billing for air-time to the calling party, each has certain practical limitations in actual use. When implemented in a real network, typically one carrier actually performs the calling party billing service for the wireless service provider. For example, using the Emery et al. type approach, a local exchange carrier might contract with a cellular carrier to perform the Calling Party Pays billing. In the Burns et al. system the IXC performs the billing. In the Neustein system, at least some billing is done through a separate credit card or calling card company. All of the prior art systems have been subject to some leakage, because invariably, the company processing the bills can not efficiently bill every type of caller.

As a practical matter, the carrier performing the bill processing function can pass the Calling Party Pays charges on only to those calling parties with whom that carrier has some type of existing billing arrangements. The local exchange carrier example actually provides the most effective solution, because on a very large percentage (typically 80–85%) of calls to the wireless telephone customers the callers are within the service area and are customers of the local exchange carrier. In such cases, the local exchange carrier can easily add the Calling Party Pays charges to the normal telephone bills for the callers. However, some calls will not originate from customers of the billing carrier. In the local carrier example, that carrier has no billing relationship with parties who make incoming calls through an interexchange carrier, parties calling from payphones, parties calling from a hotel or motel or hospital, parties served by a competing local exchange carrier, parties calling from other wireless networks, etc. Calls that the billing carrier can not process to bill the charges to the calling party are considered "leakage" with respect to the Calling Party Pays service, The wireless carrier could elect not to complete calls that the billing carrier could not process for Calling Party Pays service (leakage), and the carriers would set the call processing logic accordingly. However, this limits the types of incoming calls that the network completes. This blockage of certain calls limits the attractiveness of the Calling Party Pays service to wireless customers and sends a conflicting message to subscribers, particularly when the wireless carrier also is trying to encourage subscribers to widely distribute their wireless numbers to potential callers. To broaden usage in spite of leakage, some carriers have completed all incoming calls, and the wireless service carrier and/or the billing carrier has absorbed the leakage as a cost of doing business. However, this forced the carrier(s) involved to charge higher fees for the services or accept reduced profitability when compared to wireless services billed in the normal manner. Particularly from the point of view of the wireless carrier, who normally charges a per minute fee for all air-time, any completed but unbilled calling party pays calls essentially appear as lost revenues.

The other option for handling the problematic types of calls is to complete the calls to the subscriber but charge the air-time rates to the called subscriber. Clearly, this approach defeats the purpose of the Calling Party Pays service. Often, the subscriber does not know if an incoming call receives the Calling Party Pays treatment or accrues an air-time charge to the subscriber's own account. As a result, the wireless service subscribers remain reluctant to distribute their wireless telephone numbers to large numbers of potential calling parties, who may call in such a manner as to still generate charges to the subscribers.

Clearly a need exists for systems and methodologies which enable one or more carriers to provide Calling Party Pays wireless services, with little or no leakage, i.e. no class of calls that the carriers can not efficiently bill to the calling party.

DISCLOSURE OF THE INVENTION

The invention addresses the above stated needs and overcomes the stated problems by providing a network architecture and call processing logic, which enable Calling Party Pays billing for calls to wireless subscribers including incoming calls that would otherwise leak through the billing operations of the principle carriers. A landline network routes incoming calls for a Calling Party Pays subscriber to the wireless carrier's network. The landline network recognizes each call subject to Calling Party Pays billing. If the carrier operating the landline network can bill a party associated with the calling station, that network routes the call to the mobile carrier's network and creates records for billing for the air-time. However, if the landline network can not bill a particular calling party, the landline network hands the call off to another switch. This switch provides access to one or more alternate billing facilities. The alternate billing facilities preferably include a clearinghouse and a credit card billing system. A database indicates whether it is possible to bill for the air-time through the clearinghouse. If so, the switch completes the call to the mobile carrier's network and creates appropriate records to enable the clearinghouse to bill the air-time to the party associated with the calling station. If the caller is not billable through the clearinghouse, the switch extends the call to the automated credit card billing system. The credit card system makes all necessary records to bill the air-time charges for the call and bills the time against the caller's credit card account.

Thus, one aspect of the present invention relates to a method of providing a calling party pays billing treatment on a call to a wireless subscriber station. The method entails routing a call for a telephone number of a calling party pays type wireless service subscriber station from a calling station, through a landline network operated by a carrier, to a predetermined switching office of the landline network. Upon detection that calling party pays billing should apply to the call, a determination is made as to whether or not the landline carrier can bill charges to a party associated with the calling station. If so, the method involves routing the call from the predetermined switching office to the wireless communication network serving the called wireless station. When the wireless network completes the call to the called station, the switching office of the landline network records appropriate call completion data. The call completion data is forwarded to a billing system operated by the landline carrier, and that carrier's billing system bills the party associated with the calling station for the completion of the call through the wireless network. For example, the billed completion charges will include any air-time charges imposed by the wireless carrier.

In the inventive method, if the landline carrier can not bill charges to a party associated with the calling station, the method proceeds with call completion and billing via a different sequence of steps. Under these circumstances, the method involves routing the call from the switching office to another switching office. A determination is made to identify one of a plurality of alternate billing facilities, which can bill the charges to a party associated with the calling station. Call data recording for the identified alternate billing facility is started, and the call is routed to the wireless network for completion to the wireless subscriber station. This recording of data enables billing the party associated with the calling station for completion of the call. The billed party may be a subscriber associated with the calling station. The subscriber may be the actual person making the call or another user of the station. In some cases, the billed party is the actual caller, for example, when the call is billed to the caller's credit card account.

In the preferred embodiment, the landline carrier network is an intelligent implementation of a switched telephone network. The office providing the communication link to the wireless network has access to a database and/or a control node of the intelligent network. Call processing may involve access to the database or control node to determine if the call is to a Calling Party Pays subscriber station. Access to control records in the node determines if there is an applicable exception to the Calling Party Pays billing feature and/or whether or not the particular landline carrier can bill a party associated with the calling station. Typically, a node of the intelligent network determines whether or not the calling station is that of a subscriber to services of the landline carrier.

The alternate billing facilities preferably include an existing clearinghouse system, which may be similar to systems commonly used for clearing roaming charges between various cellular service providers. The alternate billing facilities also may include a credit card billing system. The identification of one alternate billing facility to handle a call involves accessing a database of subscriber related information to determine if the party associated with the calling station is billable through the clearinghouse. If so, then the switch routes the call to the wireless network and accumulates accounting data regarding the call. After disconnection of the call, the switch forwards the data to the clearinghouse, for use in later generation of the invoice to the party of the calling station. However, if the clearinghouse can not bill the party affiliated with the calling station, then the credit card billing facility is selected.

In the preferred embodiment, the credit card billing system then interacts with the caller to obtain appropriate billing information to enable alternate billing, typically to the caller's credit card account. The switch then routes the call to the mobile carrier's network and instructs the mobile carrier's network not to record data regarding completion. In this situation, the credit card billing system remains connected to the call through the switch. The credit card billing system rates the call for billing purposes and makes all necessary records to bill the air-time charges for the completed Calling Party Pays call to the credit card account of the caller.

The access to one or more alternative billing facilities essentially provides one or more mechanisms to handle Calling Party Pays calls that the landline carrier and its facilities can not readily process for billing purposes. As a result, if the calls are completed to the wireless subscriber station, there is a facility with the capability to bill the calling party or other party associated with the calling station. Virtually no calls leak through for completion to the called wireless station without application of some form of the Calling Party Pays billing procedures.

The subscriber may elect to set up one or more exceptions, to allow certain persons to call the wireless station without having to pay. In these situations, the called subscriber agrees to pay. These exception calls, however, are not leakage because the subscriber determines precisely who may complete such calls, and the wireless carrier bills the air-time charges to the wireless subscriber in the normal course of business.

The improved efficiency of the Calling Party Pays billing procedures, provided by the invention, eliminates potential losses in revenues to the carriers and makes distribution of wireless telephone numbers more attractive to wireless subscribers.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The drawing figures depict the present invention by way of example, not by way of limitations. In the figures, like reference numerals refer to the same or similar elements.

DETAILED DESCRIPTION OF THE PREFERRED EMBODIMENTS

The invention involves a system architecture and call processing logic to enable Calling Party Pays service and enable billing for Calling Party Pays calls, without leakage or blockage of calls that are not billable through the normal billing operations of the principle carriers. The architecture includes a landline carrier network, such as a LEC network, that routes the bulk of all incoming calls to the wireless service provider's network. The LEC network recognizes each call that may be subject to Calling Party Pays treatment. If the LEC can bill the calling party or an associated subscriber, the LEC network routes the call to the mobile carrier's network, instructs the mobile carrier's network not to record data regarding completion and creates appropriate records to enable the LEC systems to bill for the air-time. However, if the LEC network determines that the LEC network can not bill someone associated with the calling station for completion of the Calling Party Pays call, the LEC network hands the call off to other facilities, that may be operated by a third party.

The other facilities preferably include a switch, a database and a credit card billing system. The database indicates whether it is possible to bill for the air-time through an established clearinghouse system. If so, the switch completes the call to the mobile carrier's network, instructs the mobile carrier's network not to record data regarding completion and creates appropriate records to enable the clearinghouse to bill for the air-time.

However, if the database records do not indicate the ability to bill through the clearinghouse, the switch extends the call to the automated credit card billing system. This system interacts with the caller to obtain appropriate billing information to enable alternate billing, typically to the caller's credit card account. The switch then routes the call to the mobile carrier's network and instructs the mobile carrier's network not to record data regarding completion. In this situation, the credit card billing system remains connected to the call through the switch, to enable that system to perform the necessary timing and rating functions for billing. The credit card system makes all necessary records to bill the air-time charges for the completed Calling Party Pays call to the credit card account of the caller.

Figure 1:
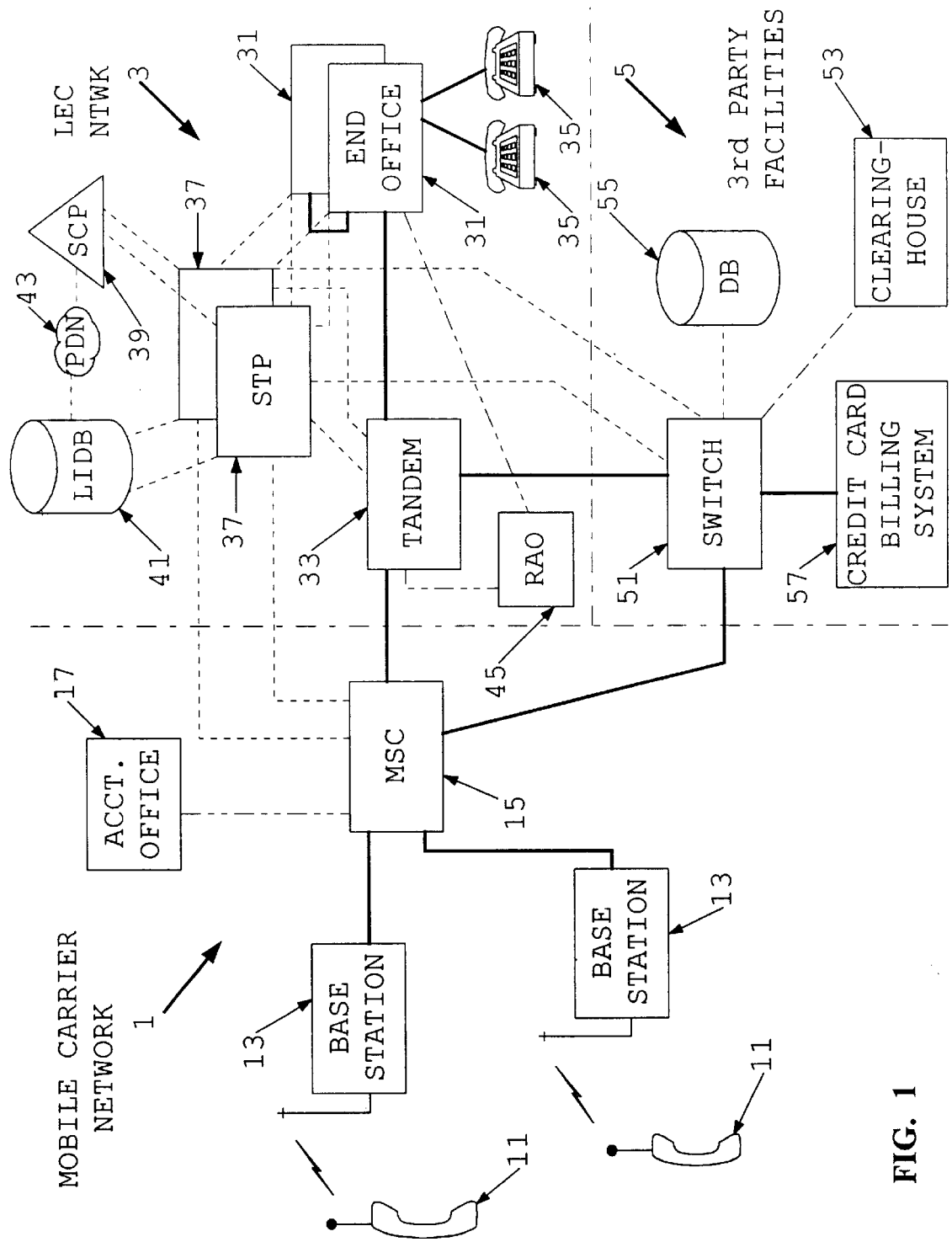
FIG. 1 is a simplified block diagram of a telecommunication system in accord with the invention for providing Calling Party Pays services, with no leakage of calls through to called mobile subscribers for which there is no mechanism to bill for the completed calls.

FIG. 1 depicts an exemplary system for providing wireless telephone communication services, including Calling Party Pays service, in accord with the invention to subscribers of a wireless carrier. The wireless carrier operates a network 1. Many of the calls to the wireless or mobile subscriber terminals 11 originate in the existing landline network. The landline network may connect to the wireless carrier network 1 in a number of ways and/or from the networks of a number of different classes of landline carriers. In the illustrated embodiment, a local exchange carrier (LEC) network 3 provides the connections and related call processing services to the wireless network 1.

To facilitate rating and billing of calls that would otherwise leak through the Calling Party Pays operations of the networks 1 and 3, the system of FIG. 1 also utilizes certain additional facilities that may be provided by one or more third parties. One or more other carriers or independent operators may provide these facilities. In future, the wireless carrier or the LEC may opt to add some or all of these facilities to their own network systems. For convenience of reference, the third party facilities are collectively identified by the numeral 5.

As shown, the exemplary wireless telephone network 1 provides cellular or personal communications service (PCS) type services to mobile stations depicted by way of example as mobile handsets 11. The network 1 enables users of the mobile stations 11 to initiate and receive telephone calls to each other as well as to telephones accessible through the public switched telephone network (PSTN), in this embodiment through the LEC network 3.

The wireless telephone network 1 may be analog, or the network may utilize any of the common digital standards for wireless telephone services. In the preferred embodiment, the network 1 is a dual-mode network, providing a standard digital service as well as analog cellular telephone service. In such a network, some of the mobile stations 11 will be analog stations, for example conforming to the AMPS standard. Some of the mobile stations 11 will be digital stations and many of the mobile stations 11 will be dual-mode units containing both analog and digital transceivers.

FIG. 1 shows a simplified version of a common implementation of the wireless carrier's telephone network 1. The network 1 includes a number of wireless base stations 13, typically providing cellular radio coverage over the geographic area serviced by the network 1. In the preferred embodiment, the base stations include both analog and digital service transceivers. The base stations 13 send and receive radio signals communicated to and from compatible mobile stations 11. The base stations 13 also communicate over trunk circuits to a mobile switching center (MSC) 15. The MSC 15 controls the operations of the wireless network 1 and provides selective switched connections. The switched connections through the MSC 15 may connect base stations together, for example to enable calls between two mobile units. The switched connections through the MSC 15 also provide selected call connections to the PSTN, for example to allow a user of mobile handset 11 to make a call to or receive a call from a landline telephone station.

The analog service of the network 1 typically conforms to the Advanced Mobile Phone Service (AMPS) standard. Preferably, many of the mobile stations 11, the base stations 13, and the MSC 15 also implement a standard digital air-link interface. Digital wireless equipment is available today to support any one of several common standards, including time division multiple access (TDMA) and the Global System for Mobile communications (GSM). Other digital standards are known and/or planned for future deployment. The preferred embodiment of the digital wireless telephone network 1 supports the code division multiple access (CDMA) standard.

With CDMA, each transmitted signal comprises a different pseudorandom binary sequence, also referred to as a pseudonoise (PN) sequence, which modulates a carrier signal, spreading the spectrum of the waveform. Thus, since each CDMA subscriber unit is assigned a unique PN code, a plurality of subscriber stations can send and receive CDMA signals sharing the same frequency spectrum. If these CDMA signals were viewed in either the frequency or time domain, the multiple access signals would appear to be superimposed on top of each other. The CDMA signals are separated in each receiver of a base station or a subscriber station, by using a correlator which accepts only signal energy from the selected binary PN sequence and despreads its spectrum. The CDMA signals from other sources, whose codes do not match the selected binary PN sequence, are not despread in bandwidth and as a result, contribute only to the background noise and represent a self-interference generated by the system.

The wireless carrier network 1 also includes an accounting office 17. As part of normal operations, the MSCs 15 of the network 1 accumulate detailed call processing data regarding at least all calls completed through that network. The data for a completed call, for example, will include an identification of the mobile subscriber, the called or calling party telephone number for the other party to the call, the time of the call and the duration of the call. The MSCs 15 supply this data to the accounting office 17, preferably through an appropriate data communication link. A billing computer operating in the accounting office 17 processes the call records from the MSCs 15, to generate bills or invoices for delivery to the customers subscribing to the wireless carrier's services.

To provide the Calling Party Pays service, the wireless carrier contracts with one or more additional parties to provide certain specific processing on incoming calls to the wireless subscribers. Typically, one of these parties is a local exchange carrier (LEC) operating the portion of the PSTN network in the same region as the wireless carrier. To understand the relevant operations of the LEC network 3, it may be helpful first to provide a summary description of the elements of that network, particularly those elements that are involved in the Calling Party Pays service.

FIG. 1 provides a simplified illustration of the preferred LEC intelligent telephone network for implementing the Calling Party Pays service in accord with the present invention. As shown, the LEC's telephone network 3 includes a switched traffic network and a common channel signaling network carrying the control signaling messages for the switched telephone traffic network. The telephone or traffic network, preferably operated by the LEC, includes a number of end office type central office switching systems 31 and one or more tandem office type central office switching systems 33.

FIG. 1 shows a number of subscriber stations, depicted as telephones 35, connected to a series of end office switches 31. In the preferred implementation, the connections to the end offices 31 utilize telephone lines, and the switches 31, 33 are telephone type switches for providing landline communication. However, it should be recognized that other communication links and other types of switches could be used. Each end office type central office switch 31 provides switched telephone connections to and from local communication lines or other subscriber links coupled to end users stations or telephone sets 35. Trunk circuits carry communication traffic between the end offices 31 and between the end offices 31 and the tandem switch 33.

At lease one of the tandems 33 also provides trunk connections between the LEC network 3 and other carriers' networks. One or more of the trunks provide links to one of the MSCs 15 of the mobile or wireless carrier's network 1. From the LEC's perspective, all calls to or from the mobile stations go through such a tandem 33. As another example of carrier interconnection, the same or another tandem 33 provides connections to one or more IXC networks (not shown).

FIG. 1 shows connections to the stations 35 via lines, and typically these links are telephone lines (e.g. POTS or ISDN). It will be apparent to those skilled in the art, however, that these links may be other types of communication links. Also, although shown as telephones in FIG. 1, the terminal devices or stations 35 can comprise any communication device compatible with the local communication link. Where the link is a standard voice grade telephone line, for example, the terminals could include facsimile devices, modems etc. Most of the terminals preferably include two-way voice communication elements. Similarly, although the mobile stations appear as portable handsets 11, those skilled in the art will recognize that such stations may provide communications for a variety of other types of devices, such as facsimile machines, modems, and the like.

The lines and trunks through the central offices 31, 33 carry the communication traffic of the telephone network, including calls going to and coming from the stations 11 served through the wireless carrier network 1. The preferred telephone network 3, however, also includes a common channel interoffice signaling (CCIS) network carrying a variety of signaling messages, principally relating to control of processing of calls through the traffic portion of the network 3. The CCIS network includes packet data links (shown as dotted lines) connected between appropriately equipped central office switching systems such as offices 31, 33 and a plurality of packet switches, termed Signaling Transfer Points (STPs) 37. To provide redundancy and thus a high degree of reliability, the STPs 37 typically are implemented as mated pairs of STPs. The CCIS network of the telephone system operates in accord with an accepted signaling protocol standard, preferably Signaling System 7 (SS7).

In the preferred embodiment shown in FIG. 1, each central office 31 or 33 has at least minimal SS7 signaling capability, which is conventionally referred to as a signaling point (SP) in reference to the SS7 network. As such, the offices can exchange messages relating to call set-up and tear-down, typically in the format defined by the ISDN User Part (ISDN-UP) of SS7. At least some, and preferably all, of the central office switches 11 are programmed to recognize identified events or points in call (PICs) as advanced intelligent network (AIN) type service triggers. In response to a PIC or trigger, a central office 31 or 33 initiates a query through the CCIS signaling network to a control node or a database system, for instructions or information relating to AIN type services. Central office switching systems having full AIN trigger and query capability are referred to as Service Switching Points (SSPs). For purposes of the Calling Party Pays service, at least the tandem 33 has full SSP capability.

The databases or other control nodes of the AIN used in networks such as the LEC network 3 include a number of different types of systems facilitating an increasingly sophisticated range of new services. One example of a control node is the Service Control Point (SCP) 39. Another common example of such an AIN database system is a Line Identification Data Base (LIDB) 41.

The SCP 39 may be a general-purpose computer storing a database of call processing information. In one implementation, the SCP 39 actually is an Integrated Service Control Point (ISCP) developed by Bell Atlantic and Bell Communications Research. The ISCP is an integrated system. Among other system components, the ISCP includes a Service Management System (SMS), a Data and Reporting System (DRS) and the actual service control database also referred to as a Service Control Point (SCP). In this implementation, the SCP maintains a Multi-Services Application Platform (MSAP) database which contains call processing records (CPRs) for processing of calls to and from various subscribers. The ISCP also typically includes a terminal subsystem referred to as a Service Creation Environment or SCE for programming the MSAP database in the SCP for the services subscribed to by each individual customer.

An internal, high-speed data network, such as a token ring network, connects the components of the ISCP. The internal data network also typically connects to a number of interfaces for communication with external data systems, e.g. for provisioning and maintenance. In the preferred embodiment, one of these interfaces provides communications to and from the SCP 39 via a private data network (PDN) 43. The PDN 43 may be a packet switched data network, such as the TCP/IP network.

The SCP may be implemented in a variety of other ways. One other alternative is to implement a database of CPRs or the like within an STP (see e.g. Farris et al. U.S. Pat. No. 5,586,177).

The LIDB database 41 is a general-purpose computer system having a signaling link interface or connection to a pair of STPs 37. The LIDB computer system runs a database program to maintain a database of information relating to customer accounts and identifications. For example, a subscriber's entry in the LIDB database might include the subscriber's telephone number, a personal identification number for credit card billing purposes, and the subscriber's name and address. The LEC LIDB 41 contains one such record for all of the LEC subscribers with a defined service area. As discussed more later, for the inventive service, the LIDB 41 also contains a record for each wireless subscriber who subscribes to the Calling Party Pays service. The record for each such wireless subscriber may be accessed by means of the wireless subscriber's mobile telephone number. Like the SCP, the LIDB 41 may have an interface to the PDN 43.

Increasingly, the MSC offices of wireless networks also have CCIS signaling capability. The wireless carrier may operate its own CCIS network using STPs, or the wireless carrier may contract with another carrier to provide any necessary STP switching for signaling purposes. In the system of FIG. 1, the MSC(s) 15 of the wireless carrier network 1 have SS7 signaling links connecting to the STPs 37 of the pair shown within the LEC network 3. Some wireless carriers contract with IXCs to meet their STP needs, in which case signaling between the STPs 37 of the LEC network 3 and the MSCs 15 would go through one or more STPs (not shown) operated by an IXC.

On a normal call in the LEC network 3, an end office type switch 31 will detect an off hook condition on the line and provide dial tone. The switch 31 identifies the line by its office equipment (OE) number and retrieves profile information corresponding to the OE number and off-hook line. If needed, the profile identifies the currently assigned telephone number. The switch in the end office 31 receives dialed digits and routes the call. The switch may route the call to another line serviced by that switch, or the switch may route the call over trunks and possibly through one or more tandem offices 33 to an office 31 that serves the called party's station or line. The switch terminating a call to a destination will also utilize profile information relating to the destination, for example to forward the call if appropriate, to apply distinctive ringing, etc.

If the caller in the LEC network 3 calls a number of a wireless or mobile station 3, served through the network 1, the serving end office 31 recognizes the NPA-NXX digits in the dialed number as those of a carrier served through the tandem 33. The end office 31 responds by routing the call to the tandem 33. In normal call processing, the tandem would route the call to the MSC 15 for completion to the destination station 3. There would be no AIN triggering in either the originating end office or the tandem. The inventive Calling Party Pays service, however, relies on AIN call processing, preferably triggered in the tandem 33 as discussed more below.

In general, AIN call processing involves a query and response procedure between an SSP capable switching office 31 or 33 and a control node or a database system, such as the SCP 39 or the LIDB 41. The SSP capable switching offices initiate such processing upon detection of triggering events. At some point during processing of a telephone call, a central office switching system 31 or 33 will recognize an event in call processing as a 'Point in Call' (PIC) which triggers a query to the appropriate node 39 or 41. The node 39 or 41 will return an instruction to the switching system to continue call processing. This type of AIN call processing can utilize a variety of different types of triggers to cause the SSPs to initiate the query and response signaling procedures. In the presently preferred embodiments discussed below, the Calling Party Pays service utilizes a trigger set in the tandem 33 against a range of numbers (e.g. NPA-NXX digits) used by the wireless carrier subscribers.

In general, the SCP 39 provides instructions relating to AIN type services. The LIDB 41 typically provides subscriber account related information, for calling card billing services or for subscriber name display purposes in an enhanced caller ID application. In the Calling Party Pays service, the presence of an account record for a subscriber of the mobile carrier in the LIDB 41 serves as an indication that a particular subscriber telephone number of the wireless carrier has an associated subscription to the Calling Party Pays service. The AIN call processing logic within the SCP 39 then makes several determinations, which are used to decide how to proceed. For example, the SCP logic recognizes if the particular caller agrees to pay the charges and whether or not the LEC can bill the calling party. If appropriate, the SCP logic also may determine whether or not an exception applies to the calling party pays billing treatment for the specific call.

In one embodiment of the invention, existing accounting capabilities of the LEC network 1 are used to bill LEC subscribers for air-time charges for their calls to Calling Party Pays subscribers. Other call data recording techniques may be used. To fully appreciate the data operations of the actual embodiment, it may be helpful to briefly review the accounting systems and operations of the LEC network 3.

Various network elements, such as the switches 31, 33 of the LEC network 3, generate automatic message accounting (AMA) records. Such records are used to provide call details to enable the local exchange carrier to bill for the completed calls, for example to bill the end users, to bill interexchange carriers (IXCs), to bill competing local exchange carriers (CLECs), etc. The AMA records may also provide call details for other network operations, e.g. for maintenance purposes.

In normal operation, a switch examines a customer's service request, typically the destination telephone number, and based on customer profile or service information determines if there is a need for AMA recording for the call, for example if the call is a long-distance call. If the call involves signaling communication with an SCP, an instruction from the SCP can override the normal decision process regarding AMA recording. The present invention takes advantage of this feature, so that under certain circumstances, the SCP 39 can instruct the tandem switch 33 to make AMA records, to enable billing LEC customers for Calling Party Pays calls.

If AMA recording is necessary for a particular call, the switch outputs AMA records for significant events in processing of the call. The AMA records are typically in the Bellcore AMA Format (BAF). The AMA records from all of the carrier's switches 31, 33 go to one or more billing systems, typically in a regional accounting office (RAO) 45. The records may be transported to the RAO by physical transport of data tapes, but preferably, each of the switches 31, 33 has an AMA Transmitter (AMAT) or the like coupled to an appropriate data link to allow electronic communication of the records to the RAO 45.

As will be understood by those skilled in the art, AMA equipment records call details at each stage of a connection. The calling and called party numbers are registered initially. An answer entry registers the time of connection, and the terminating entry registers the time of disconnect. A common identifier in each entry serves to link the entries relating to a particular call, to distinguish them from those of other calls.

In the RAO 45, the AMA data records are edited and checked for integrity and supplied to the appropriate billing system. For this purpose, a message-processing server (MPS) assembles the various entries relating to a call into a completed message. Any incomplete messages are analyzed for administrative purposes and fraud detection. The complete messages are loaded into the billing system. For example, a billing system, which some carriers refer to as the Customer Record information System (CRIS), processes records for end user billing. The CRIS system calculates the monetary amount for each usage event from the complete billing message, identifies the appropriate customer's billing account and posts the billable amount to that account.

The system shown in FIG. 1 for providing the Calling Party Pays service also includes additional facilities 5 that may be provided a third party. The third party may be another carrier or some other entity that has agreed to provide certain specific processing capabilities to enable the Calling Party Pays billing for calls from parties that the LEC can not bill.

The third party billing entity may be any entity with which the cellular carrier and/or the LEC contract to process the Calling Party Pays calls that the LEC can not bill. This entity provides access to at least two alternate billing arrangements. One arrangement involves billing through a clearinghouse. The other arrangement involves automated credit card processing, to interact with the caller to obtain, validate and bill-to the caller's credit card. The third party may provide the clearinghouse and/or the credit card billing system, or the third party may have standing agreements with other companies that operate the clearinghouse and/or the credit card billing system.

The third party facilities 5 in the system shown include a telephone switch 51. The switch 51 is generally similar in structure and operation to any of the switches 31, 33 of the LEC network 3. The switch 51 has normal telephone switching capabilities. The switch 51 may also have rating and data recording capabilities, which might be provided for example by AMA recording equipment in a telephone switching office. As discussed more below, the switch 51 provides AMA records of certain Calling Party Pays calls to a clearinghouse 53, for bill processing.

The switch 51 connects through trunk circuits to both the LEC tandem 33 and the MSC 15. The switch 51 also communicates call set-up signaling with both the LEC tandem 33 and the MSC 15. The signaling may be in-band, but preferably this signaling uses SS7 communications, for example, through one or more STPs 33 of the LEC and/or another CCIS service provider (not shown).

The third party facilities 5 also include a database (DB) 55, which may be similar to the LIDB, but maintained by the third party. The database DB identifies all customers that the third party can bill through the clearinghouse 53.

The switch 51 and database DB 55 may be implemented by a central office switching system and an intelligent network database system communicating via SS7, similar to the systems of the LEC, for example if the third party service provider is another carrier offering its own variety of telecommunication services. Alternatively, the third party may provide only the switch and database together with data communications to the clearinghouse. In such a case the third party may use other implementations of the switch 51 and database DB 55, such as an integrated unit with both telephone switching and database look-up capabilities.

In general, when the LEC tandem 33 routes a call to the switch 51, the systems of LEC network 3 already have determined that the calling party has agreed to pay the air-time charges but the LEC can not bill the particular subscriber associated with the calling station. The switch 51 executes a routine to access the database 55 to determine if the third party can bill the calling station subscriber via the clearinghouse. If so, the switch 51 completes the call through the MSC. At this time, the switch makes the AMA records for later delivery to the clearinghouse system 53 and provides the signaling to the MSC 15 to suppress its normal data reporting regarding billing.

For Calling Party Pays calls that can not be billed either through the LEC or the clearinghouse, the system of FIG. 1 includes an automated credit card billing system 57. The switch 51 provides selective call connections, for voice grade communications with callers, to the credit card billing system 57. The system 57 is a standard system for providing voice prompts to callers and collecting dialed digit or spoken information, for example, to obtain a credit card number from a caller. The system may also obtain expiration date and a PIN relating to the caller's credit card account. The system 57 communicates with existing credit card company equipment to verify account status and apply accrued charges to identified credit card accounts. The system 57 also includes telephone call rating equipment, to time telephone calls processed through the system 57 and calculate costs for such calls, including the billable air-time charges.

As noted, when the LEC tandem 33 routes a call to the switch 51, the switch 51 executes a routine to access the database 55 to determine if the third party can bill the caller via the clearinghouse. If the database records indicate an inability to bill through the clearinghouse, the switch 51 routes the call to the credit card billing system 57, for processing. If the credit card system 57 obtains all the necessary information, it instructs the switch 51 to complete the call. In this case, however, the system 57 remains in the call connection in order to time rate the call. The switch 51 does not make AMA records. However, the switch does signal the MSC 15 to suppress its normal data reporting regarding billing. The billing system 57 accumulates the necessary records regarding the call and charges appropriate fees to the caller's credit card account.

Figure 2:
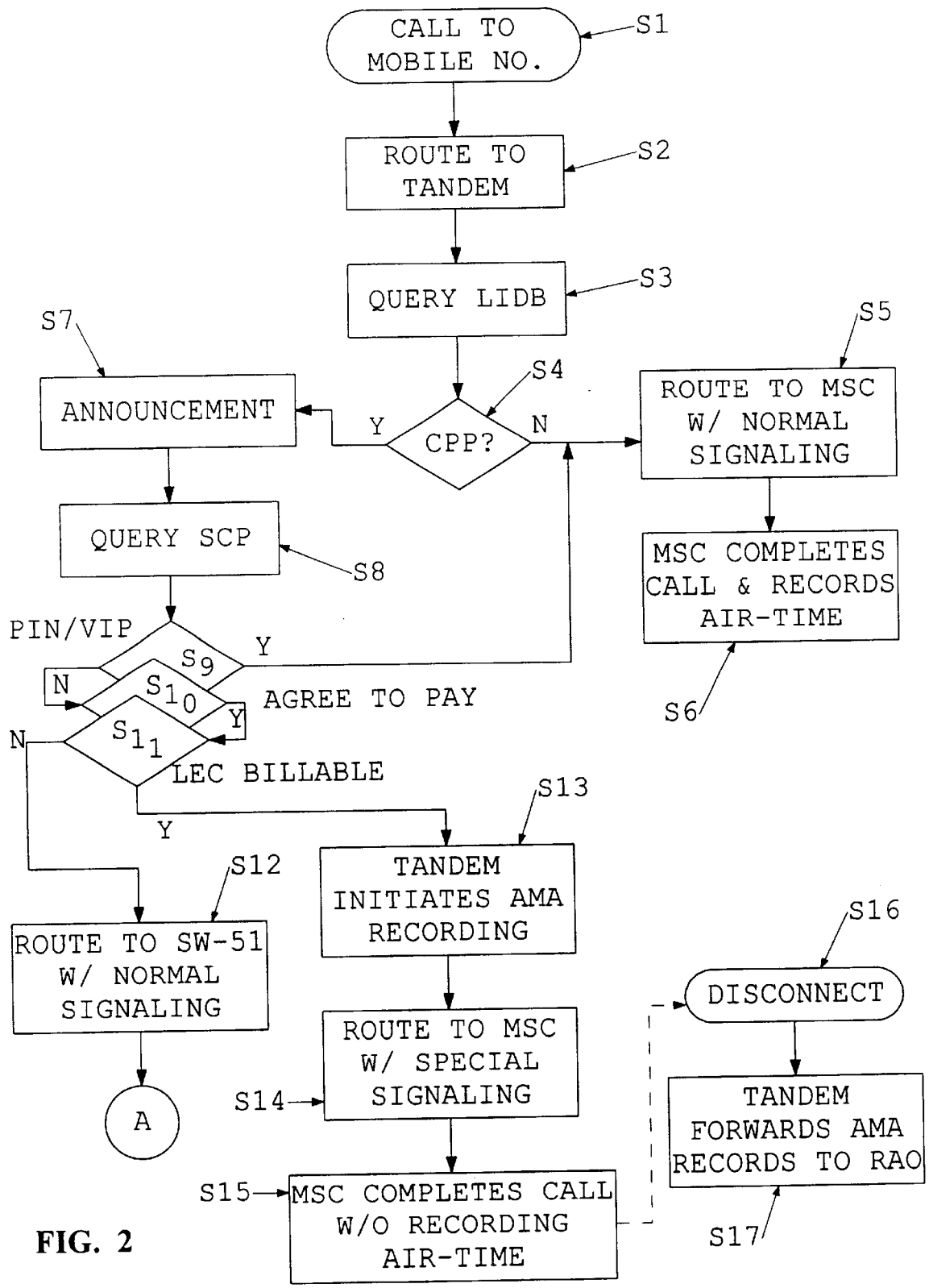
FIG. 2 is a flow chart of the call processing through the local exchange carrier network and the mobile carrier network portions of the system of FIG. 1.

It may be helpful to consider a call, from one of the LEC customer stations 35, directed to a station 11 served through the wireless carrier network 1, in detail. FIG. 2 is a simplified flow chart illustrating the processing involved in one such call.

Processing begins when the caller at station 35 takes the station handset off-hook and makes the call by dialing the mobile station telephone number (S1). In operation, the end office 31 serving the calling station routes the call to the tandem 33 (S2). As part of this routing, the end office signals the tandem 33. The ISDN-UP call set-up signaling to the tandem includes a variety of information, such as the calling party telephone number and the dialed destination number. In this example, the dialed destination number is the telephone number for the called mobile station 11.

The tandem 33 recognizes that the call is one intended for a mobile station 3, for example from the NPA-NXX digits of the dialed number. In this case, the processing hits the PIC or trigger, preferably set in the tandem against the wireless carrier's NPA-NXX digits. In response to this PIC, the tandem office 33 launches a Transaction Capabilities Applications Part (TCAP) query message through one or more of the STP(s) 37 to the LIDB database 41 (S3).

The next step essentially is a determination of whether or not the Calling Party Pays (CPP) service applies. The query message to the LIDB includes the telephone number associated with the called wireless mobile station 3 as well as an indication of the cause of the query, i.e. the triggering event. From this information, the LIDB database 41 recognizes that the query is a request for a determination regarding the wireless carrier's Calling Party Pays service. The LIDB database could make the determination in a number of ways. If every subscriber of the wireless carrier has a record in the LIDB, those for subscribers with Calling Party Pays service would include a special indicator. Preferably, only the wireless subscribers with the Calling Party Pays service will have records in the LIDB database. The presence or absence of a record associated with a called subscriber's mobile telephone number indicates whether or not that called station subscriber has the Calling Party Pays service.

Thus, in the preferred embodiment, the LIDB database 41 uses the called party telephone number, to determine if there is a record in the database, and if so, to retrieve that one subscriber's account file record from the database. The LIDB database 41 compiles a TCAP call control type response message, including the appropriate instructions regarding Calling Party Pays processing, and returns that response message to the tandem office 33 via the SS7 network.

Essentially, the LIDB 41 determines if the called wireless customer subscribes to the Calling Party Pays service based on the presence or absence of a record associated with the destination mobile telephone number, and step S4 creates a branch in the call process flow based on whether or not this call to a mobile customer is one to a CPP subscriber. If the wireless destination number is not one associated with a Calling Party pays subscriber, processing in step S4 branches to step S5. The LIDB returns an instruction to the tandem 33, and the tandem routes the call to the MSC 15, in the normal manner. As discussed more later, the normal routing here involves normal interoffice signaling to the MSC. As a result, the MSC 15 completes the call to the destination station 11, and if the call is answered, the MSC creates the data records necessary to bill the air-time charges for the call to the called subscriber (S6). At some time after disconnection of the call, the MSC 15 forwards the completed data regarding the call to the accounting office 17, for bill processing (steps not separately shown).

Now consider the situation where the called wireless subscriber does subscribe to the Calling party Pays (CPP) service. Returning now to step S4, if the record in the LIDB 41 identifies the dialed number as that of a subscriber having CPP service, processing branches from S4 to step S7. In this situation, the LIDB database informs the LEC tandem switch 33 that the CPP treatment applies. The next step is to provide the caller with an announcement regarding the service. The switch 33 connects the call to an internal announcement platform (not separately shown), to provide an audible prompt. Alternatively, the tandem 33 could connect the call to an external platform, such as an intelligent peripheral, to provide the announcement. The announcement asks the caller whether or not he/she will accept the charges for the call (including the air-time charges). The announcement preferably explains to the caller the specific action needed to signify assent to payment for the charges, and the announcement may provide details as to the actual costs. The caller may accept the charges, for example, by dialing a digit as specified in the announcement or by staying on the line for more than some threshold time period.

Essentially, the call processing flow goes through a series of conditional processing steps to identify conditions and branch accordingly. The intelligence for effecting these determinations preferably resides in the service control point (SCP) 39. If the caller simply hangs-up, the tandem 33 ends the call processing. However, if the caller stays on the line and/or enters one or more dialed digits, the tandem 33 launches a query to the SCP 39 through one or more of the STPs 37 (step S8). This second query message includes various information about the status of the call, including the reason (trigger) for this particular query, the called and calling party numbers, the fact that the caller stayed on the line and any additional digits dialed by the caller after the prompt regarding payment.

The AIN call processing logic for the Calling Party Pays service, resident in the SCP 39, then executes a series of conditional branching steps S9, S10 and S11 based on identified conditions. The precise order of the decision and branching steps may vary. The decisions and conditional branchings in the call process flow relate to whether or not the caller agreed to pay (S10) and whether or not the subscriber associated with the calling party number is billable by the LEC (S11). The preferred embodiment also determines if an exception applies (S9), for example because the caller's number is in the called customer's VIP list or because the caller entered a valid PIN defined by the called customer.

Consider first the processing associated with step S9. Many subscribers, who are interested in the Calling Party Pays service, want certain exceptions under which the subscribers willingly agree to pay the charges for calls from certain known parties. In the preferred embodiment, the Calling Party Pays service supports one or both of two types of exceptions to the calling party pays treatment.

With one exception, the subscriber establishes a list of originating telephone numbers in a list, termed a "VIP" list. The listed telephone numbers correspond to parties or locations of parties from which the subscriber wants to automatically accept calls and agrees to pay the air time charges.

The subscriber's VIP list might include telephone numbers of the subscriber's office, friends and family and the like.

The other exception involves a personal identification code (PIN). The subscriber selects one or more PINs. When the tandem prompts the caller for agreement to pay, if the caller inputs the PIN, the network recognizes a valid PIN and over-rides the calling party pays treatment.

The LEC network processing for each of these exceptions to calling party pays preferably utilizes call processing records (CPRs) that the LEC maintains in its SCP 39. In the preferred embodiment, when the SCP 39 receives the query from the tandem 33, the SCP examines the data in the second query and a CPR for the called subscriber. From the data and the CPR, the SCP determines if an exception applies. For example, the SCP may recognize that dialed digit(s) input by the caller do not indicate agreement to pay but instead match the PIN in the called party's CPR record. As another example, the SCP may determine that the caller stayed on the line more than the threshold time period for assent, but the call originated from a number in the VIP list in the called party's CPR record.

If the SCP 39 determines that a PIN or VIP list exception to the Calling Party Pays service applies, the SCP returns the instruction to the tandem switch 33, and processing branches from S9 to step S5. In response, the tandem 33 again routes the call to the MSC 15, in the normal manner (S5). The tandem provides normal interoffice signaling to the MSC 15, after which the MSC 15 completes the call to the destination station 11. If the call is answered, the MSC creates the data records necessary to bill the air-time charges for the call to the called subscriber (S6). At some time after disconnection of the call, the MSC 15 forwards the completed data regarding the call to the accounting office 17, for bill processing.

Now, returning to step S9, assume that neither the PIN exception nor the VIP exception applies. Processing therefore branches to step S10. The SCP 39 now checks to see if the caller agreed to pay. Although the steps are not separately shown for convenience, if the caller did not assent (e.g. entered the wrong digit), the SCP may return an instruction to the tandem to terminate the call. Alternatively, the SCP may instruct the tandem to repeat the announcement prompt at least one more time before disconnecting the call if the caller still does not agree to pay for the air-time charges.

Assuming that the data from the query (S8) indicates an agreement to pay, processing in step S10 branches to step S11. At this point, the SCP 39 determines if the LEC can bill a subscriber associated with the calling party station, for example, if the caller is a subscriber of services from the LEC. The SCP may make this determination of billing capability from data records stored in the SCP 39, or the SCP may communicate with the LIDB 41 through the private data network 43, essentially to reference the calling party billing record within the LIDB.

At this point, if the LEC can not bill this caller, step S11 causes a branch to step S12. The SCP 39 transmits a response message back to the tandem, but in this case, the tandem 33 routes the call to the switch 51 in the third party facilities 5. The tandem 33 provides all of the necessary information regarding the call to the switch 51, via standard interoffice signaling, preferably using ISDN-UP messages over SS7 links. The further processing of such a call will be discussed more later with respect to FIG. 3.

Continuing the discussion of FIG. 2, assume again that there is no exception, and the caller agreed to pay, but the LEC can bill the caller. In this situation, the processing at step S11 results in a branch to step S13. Now, the SCP 39 returns an instruction to the LEC tandem 33, which causes several actions by the LEC tandem. First, the tandem 33 initiates AMA recording for the call within the tandem (S13), so that the tandem will record all necessary information to enable billing for the call to the LEC's calling subscriber. For example, at this point, the tandem 33 makes an initial AMA journal entry recording the calling and called party numbers. The tandem 33 also completes the call to the wireless carrier's MSC 15. In this case, however, the tandem 33 provides special signaling to the MSC 15 (S14) in a manner discussed below. The MSC completes the call to the destination station 11, but here the MSC does not record the information for air-time billing to the called party (S15).

At this point, consider the signaling between the tandem 33 and the MSC 15. The MSC 15 normally makes the records to enable billing of air-time charges, on all calls to the wireless subscribers. For calls subject to the calling party pays billing treatment, the MSC need not make such records. To enable the Calling Party Pays service, the signaling from the tandem 33 therefore includes some form of instruction or flag. From the state of the flag on each incoming call received from the LEC network 3, the MSC 15 recognizes whether or not it should make the records for billing to the called wireless subscriber. The instruction or flag could tell the MSC to make the billing records only on limited calls. In such a set-up, the signaling would include the special flag only on the exception calls (e.g. completed in step S6). However, the MSC would need to be able to distinguish calls to Calling Party Pays subscribers from other incoming calls that should receive the normal treatment for recording data to bill the air-time to the called subscribers.

To minimize the change in programming and operations of the MSC, it is preferred that the signaling for calls when the MSC should perform its billing functions remain essentially unchanged (as in S5 discussed above). In this way, the MSC 15 continues to receive normal signaling for calls to subscribers not having the Calling Party Pays service (S4-S5). The MSC also receives normal signaling for calls to Calling Party Pays subscribers when the MSC needs to make the normal records for billing to the wireless subscribers, e.g. on calls from numbers on a VIP list or after entry of a valid PIN (S9-S5).

A number of signaling techniques may be used to provide the necessary information and the flag or instruction to the MSC. In the preferred embodiment, the tandem and the MSC communicate via an SS7 signaling network, represented by the STPS. In accord with the invention, an instruction or a flag regarding whether or not the wireless network needs to record data to bill the called subscriber is embedded within otherwise normal call set-up signaling. There are a number of fields of SS7 signaling messages that may carry the instruction(s) regarding whether or not the MSC must record the billing information. In the preferred embodiment, the calling party number field is modified as an indication to the MSC. Because the MSC will pass the calling party number from this field on through the signaling to a digital subscriber telephone, the calling number display on such a telephone actually provides an indication to the subscriber enabling her or him to recognize whether the subscriber must pay or the callers must pay when the called subscriber answers the call.

The SS7 signaling relating to call set-up includes a twenty-digit field for the calling party number. Telephone numbers currently used in the North American Numbering Plan (NAMP), however, include only ten digits. One approach to flagging Calling Party Pays calls would involve adding one or more specific digits in the unused portion of the calling number field of the SS7 signaling. For example, all calls to wireless stations from the LEC network 3 that should be billed to the called subscriber in the normal manner would include only the nonnal ten-digit number of the calling party. These calls would include calls to wireless subscribers that do not have the Calling Party Pays services as well calls to Calling Party Pays subscribers satisfying one of the exceptions (PIN or VIP). Calls to Calling Party Pays subscribers, for which the LEC will bill its customers, might include "000" added before the NPA-NXX of the calling party number. Another alternative would be to add a "#" after the last digit of the actual calling party number.

A preferred embodiment involves a selective change of the area code digits of the calling party number included in the SS7 signaling sent from the LEC tandem 33 to the MSC 15. In this embodiment, any call receiving a normal bill-to-mobile treatment would include the normal ten-digit number of the calling party, with the actual NPA-NXX digits. Calls to Calling Party Pays subscribers, for which the LEC will bill its customers, might include "000," "111" or "001" in place of the NPA digits of the calling party number.

As noted, the normal signaling could apply to calls involving the Calling Party Pays service, where the MSC need not generate the billing records. The special signaling would apply to the calls to Calling Party Pays subscribers when there are exceptions, i.e. when the MSC needs to generate billing records from such subscribers. With this approach, however, the MSC would need to distinguish between calls to Calling Party Pays subscribers and calls to other subscribers, so as to accept normal signaling and still generate billing records for calls to the other subscribers.

The example shown in the flow charts involves normal signaling on any and all calls where the MSC should generate the billing records. Calls to the Calling Party Pays subscribers, where the MSC need not generate the records for billing to the mobile customer, would involve the special signaling described above.

Thus, in the process of FIG. 2, if the call to the Calling Party Pays subscriber is from a LEC billable caller who assents to payment and there is no exception, the tandem routes the call to the MSC and uses the special signaling (S14). The MSC 15 completes the call without recording air-time (S15). When the called station 11 answers, the tandem 33 makes an answer entry on its AMA journal entry, to register the time of initial connection. At some later time, one or the other of the parties to the completed call ends the connection, typically by hanging-up their respective station 11 or 35 (S16). The various offices 15, 31, 33 of the networks 1, 3 take-down the link between the stations. At this time, the tandem 33 makes a terminating entry on its AMA journal, to register the time of disconnect.

Periodically, the tandem uploads all entries from its AMA journal to the RAO 45, including those for this and any other calls relating to the Calling Party Pays service (S17). As noted, a common identifier in each entry for a particular call serves to link the entries relating to the call, to distinguish them from those of other calls. The RAO executes a series of processing steps (not shown) to assemble the messages regarding a call into a set and from the message set compile a billing record for inclusion on the calling subscriber next monthly invoice.

The processing illustrated in FIG. 2 handles normal calls to mobile subscribers (S1–S5) as well as calls to Calling Party Pays subscribers. The processing of calls to Calling Party Pays subscribers includes calls processed with exceptions, resulting in air-time billing to the called subscriber (S1–S4, S7–S9, then S5 and S6) and those calls where the LEC bills the air-time to one of the LEC's subscribers (S1–S4, S7–S11, then S13–S17).

Consider now the case where the caller consents to payment for the air-time, and no exception applies, but the SCP 39 determines that for some reason the LEC can not bill this particular calling party. As noted above, the processing at step S11 branches to step S12. Here, the SCP 39 returns an instruction to the LEC tandem 33, but this instruction causes the tandem to route the call over a different trunk group. Instead of routing the call over a trunk to the MSC 15, as in the earlier examples, the tandem 33 routes the call to the switch S1 of the third party billing entity. When the tandem 33 routes the call to the third party switch 51, the tandem provides normal call set-up signaling. This signaling may be in-band signaling, but preferably these two switches 33, 51 utilize out-of-band signaling such as SS7 signaling through one or more of the STPs 37.

Figure 3:
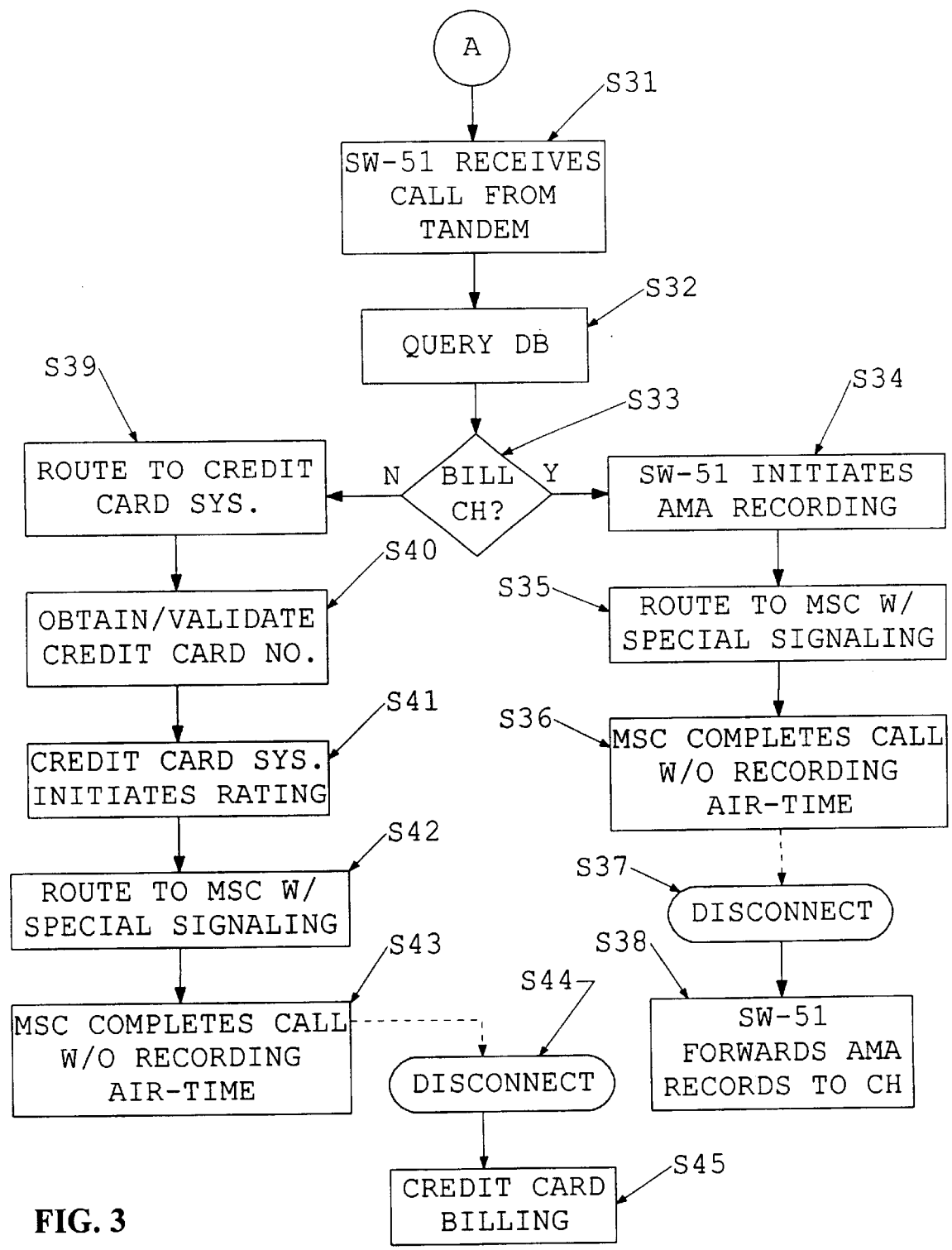
FIG. 3 is a flow chart of the call processing by other elements of the system of FIG. 1, particularly to enable billing for Calling Party Pays calls for which the local exchange carrier can not bill the callers.

FIG. 3 depicts the further processing of this type of call, principally by the third party facilities 5. At step S31, the switch (SW) 51 receives the call from the tandem 33. The switch now queries a database (DB) 55 maintained by the third party (S32). As noted earlier, this database (DB) identifies all customers that the third party can bill through the clearinghouse. The next step (S33) in the process flow involves a branching based on whether or not this call is billable to the caller through the clearinghouse (CH) 53.

If the third party can bill the caller through the clearinghouse, processing branches to step S34. Essentially, the database DB 55 returns a message informing the switch 51 of the billable status, and the switch 51 initiates AMA recording for the call. Typically, the first entry in the AMA journal registers the called and calling party numbers. The switch 51 also routes the call to the MSC 15 over an appropriate trunk (S35). As part of this routing, the switch 51 manipulates the signaling to the MSC so as to instruct the MSC 15 not to record call data for billing the air-time to the called party. Preferably, the format of this signaling is identical to that used by the LEC tandem 33 for Calling Party Pays calls billed by the LEC.

The MSC 15 now completes the call to the called station 11, but the MSC does not record information about the call for billing purposes (S36). When the called station 11 answers, the switch 51 receives appropriate signaling, and in response, the switch makes an answer entry on its AMA journal entry to register the time of initial connection. At a later time, one or the other of the parties to the completed call ends the connection, typically by hanging-up their respective station 11 or 35 (S37). The various offices 15, 31, 33 of the networks 1, 3 and the switch 51 take down the link between the stations. At this time, the switch 51 makes a terminating entry on its AMA journal, to register the time of disconnect.

Periodically, the switch uploads all relevant entries from its AMA journal to the clearinghouse 53, including those for this and any other calls relating to the Calling Party Pays service (S38). Some functions of the clearinghouse are similar to those of the RAO 45. Using the common identifier in each entry for a particular call, the clearinghouse assembles the messages regarding a call into a set and from the message set compiles a billing record. The clearinghouse forwards the billing record to the member entity having an actual billing arrangement with the calling-side customer, for inclusion in the bill to that customer. Examples of such clearinghouses are in use today, for handling roaming charges. Consider an example. Assume that the mobile carrier operates in a region where Bell Atlantic is the LEC. If Ameritech has an existing relationship with the clearinghouse 53, the clearinghouse would forward the record to Ameritech for inclusion on the invoice to Ameritech's calling customer who agreed to pay for the air-time, in a manner analogous to forwarding roaming charges for inclusion on a roaming wireless customer's Ameritech bill.

Returning now to step S33 in FIG. 3, assume that the clearinghouse can not bill the particular caller. The process flow therefore branches from S33 to S39. At this point, the switch (SW) 51 routes the call first to the credit card billing system 57 instead of to the MSC.

The credit card billing system 57 interacts with the caller to obtain a credit card number and any other information necessary to enable billing for the costs against the caller's credit card (S40). This interaction may involve announcements providing instructions to the caller and receipt of dialed digits or spoken answers as inputs from the caller. The system 57 may communicate with existing credit card company equipment to verify account status. Assuming that the caller does not hang-up and successfully inputs the credit card information, the system 57 initiates call-rating (S41) and provides an instruction to the switch 51. In response, the switch 51 routes the call to the MSC 15 (S42). In this case, however, the system 57 remains in the call connection in order to time rate the call.

In step S42, the switch 51 manipulates the signaling to the MSC so as to instruct the MSC not to bill the air-time to the called party. Preferably, the format of this signaling also is identical to that used by the LEC tandem for Calling Party Pays calls billed by the LEC. It should be noted that here the switch 51 does not make any AMA entries regarding the call.

In step S43, the MSC 15 completes the call to the called station 11, but in view of the signaling, the MSC does not record information about the call for billing purposes. Because the credit card billing system 57 remains connected to the call, the system 57 recognizes when the caller answers at station 11. At that time, the credit card billing system initiates the timing for its call rating function.

Later, one of the parties hangs up to disconnect the call (S44). The various offices 15, 31, 33 of the networks 1, 3 and the switch 51 take down the link between the stations. At this time, the billing system 57 ends its timing of the call and processes the call record for credit card billing (S45). The call rating equipment in the system 57 calculates the costs the completed call, including the billable air-time charges. The system 57 may communicate the costs to existing credit card company equipment, to apply accrued charges to the caller's identified credit card account.

As shown by the above discussion of call processing, the inventive system and methodology processes all calls coming in from the landline network to mobile customers who subscribe to Calling Party Pays service. The addition of the third party facilities, with the clearinghouse and the credit card billing system, allows Calling Party Pays treatment for all calls that otherwise would leak through the Calling Party Pays treatment by the primary landline carrier (e.g. the LEC). This eliminates the need to either pass certain unbillable calls through or block such calls, increasing the desirability of the Calling Party Pays service to the wireless carrier and to the customers.

The inventive methodology leaves only certain special exceptions (PIN or VIP list) that pass calls through with billing to the called subscriber, but the subscriber controls those exceptions. The subscriber may opt to have no exceptions. Alternatively, the subscriber selects the telephone numbers of persons to be on the VIP list or selects the persons to receive the PIN. All other calls completed to the subscriber's mobile station receive the Calling Party Pays treatment. This substantially reduces the cost to the mobile subscribers and encourages the mobile subscribers to distribute their numbers widely and allow more incoming call traffic.

Those skilled in the art will recognize that the present invention admits of a number of modifications, within the spirit and scope of the inventive concepts. For example, the preferred embodiment described above utilizes a local exchange carrier's network to route landline calls from calling parties to the mobile carrier's network. The local exchange carrier has the billing relationship with the largest number of calling parties. However, in some cases, it may be advantageous to substitute another landline carrier's network, such as that of an interexchange carrier. Alternatively, the mobile carrier may establish a similar relationship with several different landline carriers and receive calls from several landline networks, for example, from a LEC and from a CLEC and/or from an interexchange carrier. In such a case, all of the different landline carriers would process calls principally from their own subscribers but would hand calls that they could not bill off to the third party facilities, essentially as described above.

In the above discussed examples, the various switches recorded call related data using AMA recording equipment and procedures. Those skilled in the art will recognize that other techniques may be used to accumulate the data regarding the time, duration and called/calling party numbers for billing by the carrier and/or for billing through the clearinghouse. For example, the LEC may program the tandem to report events in call processing to the SCP, at least for Calling Party Pays calls that are billable to LEC subscribers. A data and reporting system associated with the SCP might then accumulate the data needed for billing purposes. A variety of different call data reporting systems also are known in the wireless telephone industry. The main requirement for the data reporting by the third party facilities is compatibility of the resulting data with the systems, procedures and protocols implemented on the particular clearinghouse system.

While the foregoing has described what are considered to be preferred embodiments of the invention it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. A method of providing a calling party pays billing treatment on a call to a wireless subscriber station, comprising:

routing a call for a telephone number assigned to the wireless subscriber station from a calling station through a landline network operated by a carrier to a predetermined switching office of the landline network;

recognizing a need for calling party pays billing treatment with respect to the call;

determining whether or not the carrier can bill charges to a party associated with the calling station;

if the carrier can bill charges to a party associated with the calling station, completing and billing for the call by execution of steps comprising:

1) routing the call from the predetermined switching office to a wireless communication network serving the wireless subscriber station;
2) completing the call to the wireless subscriber station through the wireless communication network;
3) recording call completion information in the landline network operated by the carrier;
4) forwarding the call completion information to a billing system operated by the carrier; and
5) billing the party associated with the calling station for completion of the call through the wireless communication network using the billing system operated by the carrier; and if the carrier can not bill charges to a party associated with the calling station, completing and billing for the call by execution of steps comprising:
 a) routing the call from the predetermined switching office to another switching office;
 b) determining one of a plurality of alternate billing facilities which can bill charges to a party associated with the calling station;
 c) initiating call data recording for the one alternate billing facility;
 d) routing the call from said another switching office to the wireless communication network serving the wireless subscriber station;
 e) completing the call to the wireless subscriber station through the wireless communication network; and
 f) billing the party associated with the calling station for completion of the call through the wireless communication network using the one alternate billing facility and based on the call data recording, wherein the alternate billing facilities comprise a clearinghouse system and a credit card billing system, and the step of determining one of the alternate billing facilities which can bill to the party associated with the calling station comprises:

accessing a database of subscriber related information to determine if a party associated with the calling station is billable through the clearinghouse; and selecting billing through the clearinghouse if the database of subscriber related information indicates that the party associated with the subscriber station can be billed through the clearinghouse.

2. A method as in claim 1 wherein the step of initiating call data recording for the one alternate billing facility comprises recording call completion data in said another switching office, and the step of billing based on the call data recording comprises forwarding the call completion data from said another switching office to the clearinghouse for bill processing.

3. A method of providing a calling party pays billing treatment on a call to a wireless subscriber station, comprising:

routing a call for a telephone number assigned to the wireless subscriber station from a calling station through a landline network operated by a carrier to a predetermined switching office of the landline network;

recognizing a need for calling party pays billing treatment with respect to the call;

determining whether or not the carrier can bill charges to a party associated with the calling station;

if the carrier can bill charges to a party associated with the calling station, completing and billing for the call by execution of steps comprising:
 1) routing the call from the predetermined switching office to a wireless communication network serving the wireless subscriber station;
 2) completing the call to the wireless subscriber station through the wireless communication network;
 3) recording call completion information in the landline network operated by the carrier;
 4) forwarding the call completion information to a billing system operated by the carrier; and
 5) billing the party associated with the calling station for completion of the call through the wireless communication network using the billing system operated by the carrier; and if the carrier can not bill charges to a party associated with the calling station, completing and billing for the call by execution of steps comprising:
 a) routing the call from the predetermined switching office to another switching office;
 b) determining one of a plurality of alternate billing facilities which can bill charges to a party associated with the calling station;
 c) initiating call data recording for the one alternate billing facility;
 d) routing the call from said another switching office to the wireless communication network serving the wireless subscriber station;
 e) completing the call to the wireless subscriber station through the wireless communication network; and
 f) billing the party associated with the calling station for completion of the call through the wireless communication network using the one alternate billing facility and based on the call data recording, wherein the alternate billing facilities comprise a clearinghouse system and a credit card billing system, and the step of determining one the alternate billing facilities which can bill charges to a party associated with the calling station comprises:

accessing a database of subscriber related information to determine if a party associated with the calling station is billable through the clearinghouse; and selecting billing through the credit card billing system if the database of subscriber related information indicates that no party associated with the subscriber station is billable through the clearinghouse.

4. A method as in claim 3, wherein the step of routing the call from said another switching office to the wireless communication network comprises:

routing the call to the credit card billing system; and thereafter routing the call from said another switching office and the credit card billing system to the wireless communication network, the credit card billing system performing the call data recording and the billing of the party associated with the calling station based on the call data recording.

5. A method of providing a calling party pays billing treatment on a call to a cellular telephone station, comprising:

routing a call for a telephone number assigned to the cellular telephone station from a calling station through a landline telephone network operated by an exchange carrier to a predetermined switching office of the landline telephone network;

determining whether or not calling party pays billing treatment applies to processing of the call;

if calling party pays billing treatment applies to processing of the call, determining whether or not the exchange carrier can bill charges to a party associated with the calling station;

if the exchange carrier can bill charges to a party associated with the calling station, completing and billing for the call by execution of steps comprising:
1) routing the call from the predetermined switching office to a mobile switching center of a cellular telephone network serving the cellular telephone station;
2) completing the call from the mobile switching center to the cellular telephone station;
3) recording call data in the predetermined switching office;
4) forwarding the call data recorded in the predetermined switching office to a billing system operated by the exchange carrier; and
5) billing the party associated with the calling station for completion of the call through the cellular telephone network using the billing system operated by the exchange carrier; and if the exchange carrier can not bill charges to a party associated with the calling station, completing and billing for the call by execution of steps comprising:
a) routing the call from the predetermined switching office to another switching office;
b) determining if the party associated with the calling station is billable through a clearinghouse, and if so, initiating call data recording in said another switching office;
c) routing the call from said another switching office to the mobile switching center;
d) completing the call from the mobile switching center to the cellular telephone station;
e) forwarding call data recorded in said another switching office to the clearinghouse; and
f) billing the party associated with the calling station for completion of the call through the clearinghouse.

6. A method as in claim 5 wherein the mobile switching center and the cellular telephone network provide digital cellular telephone communication services to the cellular telephone station.

7. A method as in claim 5, wherein each step of routing the call to the mobile switching center comprises instructing the mobile switching center not to record data regarding completion of the call to the cellular telephone station for billing purposes.

8. A method as in claim 7, wherein if calling party pays billing treatment does not apply to processing of the call, completing and billing for the call by execution of steps comprising;
routing the call from the predetermined switching office to the mobile switching center;
signaling the mobile switching center to cause the cellular telephone network to record data regarding completion of the call to the cellular telephone station for billing purposes;
completing the call from the mobile switching center to the cellular telephone station; and
billing a party associated with the cellular telephone station for completion of the call through the cellular telephone network using the data recorded in the cellular telephone network.

9. A method as in claim 5, wherein if after routing to said another switch it is determined that the party associated with the calling station is not billable through the clearinghouse, completing and billing for the call by execution of steps comprising:
routing the call to a credit card billing system;
thereafter routing the call from said another switching office and the credit card billing system to the mobile switching center;
completing the call from the mobile switching center to the cellular telephone station;
rating the completed call through the credit card billing system; and
billing a credit card account of the party associated with the calling station using call rating data from the credit card billing system.

10. A telecommunication system, comprising:
a wireless communication network for providing wireless communication for a mobile station of a subscriber to a calling party pays communication service, the wireless communication network comprising a mobile switching center;
an exchange carrier telephone network for providing selectively switched telephone communication services to subscriber stations linked to the exchange carrier telephone network, the exchange carrier telephone network comprising: a switching office having traffic and signaling links to the mobile switching center, and a billing system;
a control node for determining whether or not the billing system can bill charges to a party associated with a calling subscriber station in response to a call from the subscriber station directed to the mobile station, wherein the switching office completes the call through the mobile switching center to the mobile station if the control node indicates that the billing system can bill charges to the party associated with the calling station;
a telephone switch having traffic and signaling links to the switching office and having traffic and signaling links to the mobile switching center, wherein the telephone switch receives the call directed to the mobile station of the calling party pays subscriber, if the control node determines that the billing system can not bill charges to the party associated with the calling station; and
an alternate billing facility coupled to the telephone switch, wherein the telephone switch completes the received call through the mobile switching center, and the alternate billing facility performs billing functions relating to completion of the call through the telephone switch and the mobile switching center, wherein:
the alternate billing facility comprises a clearinghouse system; and
the telephone switch compiles a data record of completion of the call through the telephone switch and the mobile switching center and forwards the data record to the clearinghouse system for billing to the calling party.

11. A telecommunication system, comprising:
a wireless communication network for providing wireless communication for a mobile station of a subscriber to a calling party pays communication service, the wireless communication network comprising a mobile switching center;
an exchange carrier telephone network for providing selectively switched telephone communication services to subscriber stations linked to the exchange carrier telephone network, the exchange carrier telephone network comprising: a switching office having traffic and signaling links to the mobile switching center, and a billing system;
a control node for determining whether or not the billing system can bill charges to a party associated with a calling subscriber station in response to a call from the subscriber station directed to the mobile station, wherein the switching office completes the call through the mobile switching center to the mobile station if the control node indicates that the billing system can bill charges to the party associated with the calling station;

a telephone switch having traffic and signaling links to the switching office and having traffic and signaling links to the mobile switching center, wherein the telephone switch receives the call directed to the mobile station of the calling party pays subscriber, if the control node determines that the billing system can not bill charges to the party associated with the calling station;

alternate billing facilities including a clearinghouse system and a credit card billing system coupled to the telephone switch, wherein the telephone switch completes the received call through the mobile switching center, and one of the alternate billing facilities performs billing functions relating to completion of the call through the telephone switch and the mobile switching center; and a database, coupled to the telephone switch, storing data records indicating potential calling parties billable through the clearinghouse system, wherein:

the switch completes the call directly through the mobile switching center if the data records in the database indicate that the party associated with the calling station is billable through the clearinghouse system, and the switch connects the call to the credit card billing system and subsequently completes the call through the mobile switching center if the data records in the database indicate that the party associated with the calling station is not billable through the clearinghouse.

12. A system as in claim 11, wherein the exchange carrier telephone network further comprises:

another switching office;

trunks circuits for carrying traffic between the switching offices of the exchange carrier telephone network; and an interoffice signaling network separate from the trunk circuits, wherein the control node comprises a service control point, coupled for communication with the switching offices of the exchange carrier telephone network via the interoffice signaling network.

13. A system as in claim 12, wherein the exchange carrier telephone network further comprises another database, coupled for communication with the switching offices of the exchange carrier telephone network via the interoffice signaling network, for storing subscriber information, including information for recognition of calls to the mobile station of the calling party pays subscriber.

14. A system as in claim 12, wherein the signaling links from the switching office to the mobile switching center and the signaling links from the telephone switch to the switching office comprise links through the interoffice signaling network.

15. A system as in claim 11, wherein the wireless communication network comprises a plurality of mobile switching centers and base stations, for providing digital cellular telephone services to a plurality of mobile stations.

16. A system as in claim 15, wherein the exchange carrier network comprises a plurality of switching offices for providing local exchange telephone services.

* * * * *